Jan. 19, 1937.   C. LORBER   2,068,497
TRACING CHART
Filed March 15, 1934
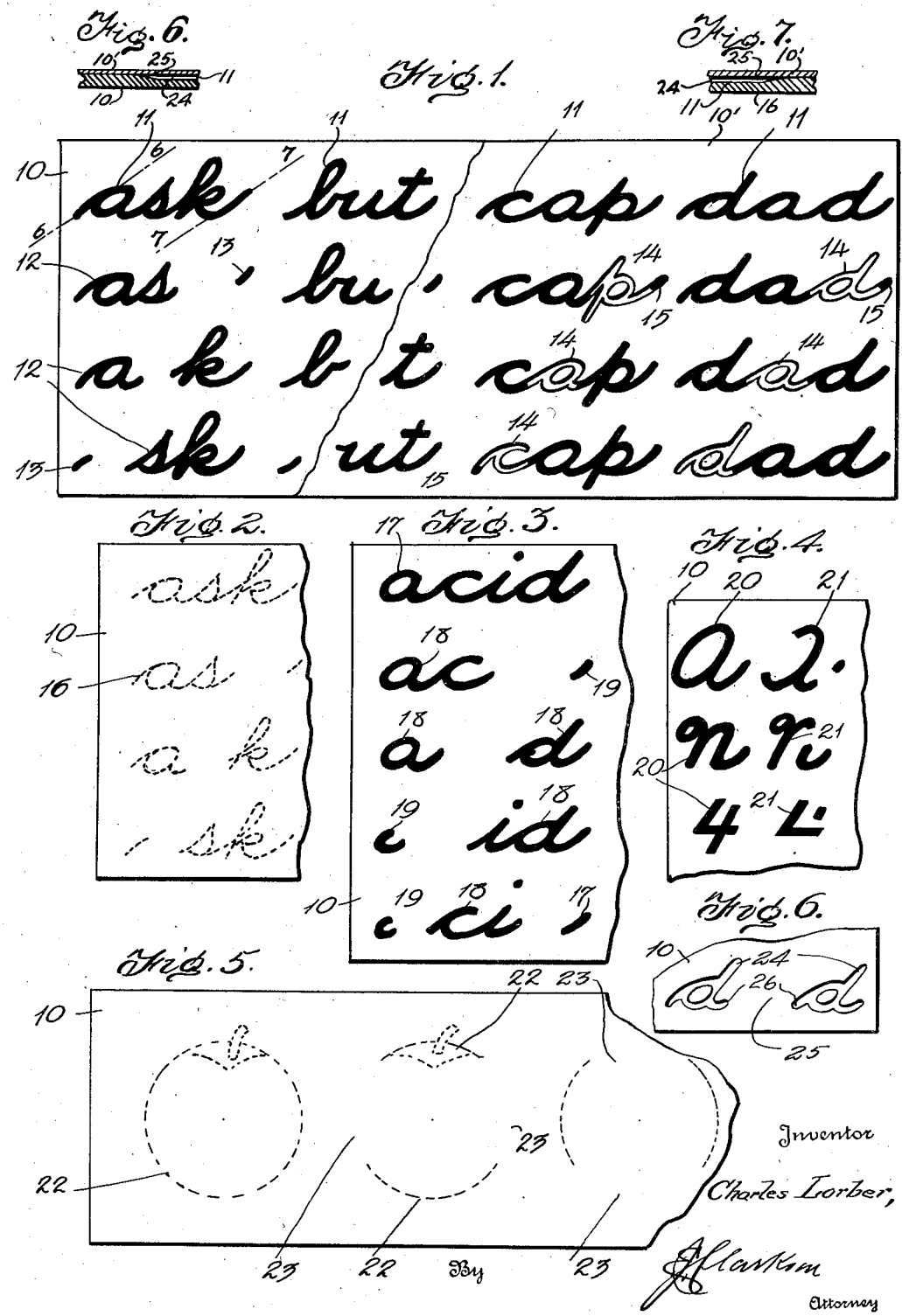
Inventor
Charles Lorber,
By
Attorney Patented Jan. 19, 1937

2,068,497

UNITED STATES PATENT OFFICE 2,068,497

TRACING CHART

Charles Lorber, Louisville, Ky.

Application March 15, 1934, Serial No. 715,705

2 Claims. (Cl. 35—37)

This invention relates to educational appliances and has special reference to tracing charts for instruction in spelling and writing.

A first important object of the invention is to provide a chart of the above described type wherein such partial forms are represented by printed lines having portions broken away to leave blank spaces.

A second important object of the invention is to provide a novel chart of this kind wherein the partial forms illustrated will be represented by grooves of the shape of the complete forms but wherein only parts of such grooves will be printed or colored so that the visual appearance of the partial forms will be by interrupted print lines.

A third important object of the invention is to provide a novel form of chart for instruction in spelling wherein word forms are each associated with partial word forms having one or more missing letters.

A fourth important object of the invention is to provide a novel chart of this kind having words with missing letters arranged in groups wherein the several missing letter words will have a different letter or letters missing from each.

With the above and other objects in view as will be hereinafter apparent, the invention consists in general of certain novel details of construction and combinations of parts hereinafter fully described, illustrated in the accompanying drawing and specifically claimed.

In the accompanying drawing like characters of reference indicate like parts in the several views, and:

Figure 1 is a view of a complete spelling chart formed in accordance with this invention and showing groups of three letter words.

Figure 2 is a partial view of a modified form of such a chart.

Figure 3 is a partial view of such a chart showing a group embodying a four letter word.

Figure 4 is a partial view of such a chart arranged for teaching the formation of single characters.

Figure 5 is a partial view of such a chart arranged for teaching the formation of a natural object.

Figure 6 is a section on the line 6—6 of Figure 1 showing the manner of impressing one end of a missing letter word.

Figure 7 is a similar section on the line 7—7 of Figure 1 showing the manner of impressing the other end of such word.

In the invention as illustrated in Fig. 1 there is provided a card 10 and along the upper part of this card there is printed a row of words 11 here shown as three letter words. These words are preferably printed in script and, while any color desired may be used, are here shown in black. The words may be printed flat on the card or may be printed at the bottom of grooves. Beneath each of the words at the top of the chart is a column of partial words 12 and in each of these partial or missing letter words a different letter is omitted. Thus, in the present example, the first word is shown as "ask". The next word below has the letter "k" missing, the word below that has "s" missing and in the bottom word of the column "a" is missing. It will be seen that where the terminal letters "k" and "a" are omitted an indicator spot 13 is printed on the chart to guide the student in finishing or beginning the word.

At the right of Fig. 1 the words are shown as printed in grooves and it will be observed that the missing letter words have blank grooves for such missing letters. Thus in the third column we find the word "cap". At the top of the column the entire word is printed in a groove formed in the card and also in each of the partial or missing letter words thereunder the entire word is impressed in the card as a groove but in the partial words only two of the letters are printed, the letters "p", "a", and "c" of the respective second, third and fourth words of the column are left as blank grooves 14 except for the terminal indicia 15 which are printed in the grooves in a manner corresponding to the indicia 12.

In the form of the invention shown in Figure 2, each word, whether full or partial is indicated by broken lines 16 on the chart 10 but otherwise the arrangement is the same as in the form shown in Figure 1.

Figure 3 shows a modification disclosing the arrangement for a four letter word 17 such as "acid" and it will be seen in this form that two letters, different in each case, are omitted from the partial words 18 under the word 17 at the top of the column and that terminal indicia 19 are used as before.

In the form shown in Figure 4 the chart 10 is arranged for teaching of the formation of single characters such as letters of the alphabet and numerals and in this case full forms 20 are printed on the card and partial forms 21 are printed on the chart, these partial forms showing portions of such characters in printed form with gaps or hiatuses between the printed portions.

In the chart shown in Figure 5 there is represented the means for teaching the formation of objects, the example here shown being an apple. In this case the chart 10 has printed thereon a complete outline of the object in dotted lines 22 succeeded by partial forms provided with gaps 23 between the dotted outlines, the gaps of one partial form being complementary to the gaps of the other form.

It will now be seen that in each of these charts there is disclosed one or more groups and that each of these groups consists of a complete form and at least one partial or incomplete form having a gap or hiatus therein. It will also be seen that, when two or more partial or incomplete forms are used the gaps or hiatuses are complementary to each other so that if such complementary gaps are filled and united in one form the union of these complementary forms will produce a complete form. Thus, the missing letters "a", "s", and "k" will make the complete word "ask", the missing letters "id" and "ac" of the second and fourth words in Figure 3 will make "acid" and the missing sides of the second apple and top and bottom of the third apple in Figure 5 will make a complete apple.

In the use of these charts several methods of instruction may be adopted. In one method the student may be given the chart and a stylus and caused to repeatedly trace the master form or complete form of the group being taught. Then a sheet of tracing paper 10' may be placed over the chart and the student caused to trace the master or complete form and the successive partial forms, filling in at the same time the gaps or hiatuses and thus making each tracing complete. Obviously, if a grooved form of the chart is used the muscular movements necessary are more readily attained than with the plain or ungrooved form and it is found that the grooved form of chart is well adapted for the instruction of younger children while the ungrooved form may be used for students of more advancement. In another method the preliminary tracing with a stylus may be omitted and tracing paper may be used from the start of the instruction. Furthermore, the charts, such as shown in Figures 1 and 3 may be used to teach spelling by having the student supply the missing letters of the partial words.

As shown in Figures 6 and 7 the characters to be traced in the formation of a word are impressed on the chart 10 as plain imprinted grooves 24 and the omitted character forming the word is left as a blank and smooth space 25. For the purpose of rendering it easy for the student to pass from the grooves to the surface 25 the grooves may have ends 26 tapered so as to guide the stylus or pencil up into the smooth surface gradually, thus presenting no abrupt shoulders tending to make it hard to pass smoothly from and to the grooves.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new is:

1. In a tracing chart for teaching writing a strip of material having depressed grooves forming at least one letter in chirographic character, the surface of the chart at the ends of each letter forming a smooth plane, the letter character formed by each of the grooves having terminal portions at which the grooves decrease gradually in depth to merge smoothly into said plane surface whereby upon a sheet of tracing paper being placed on the chart and the grooved letters traced by a tracing implement the latter will pass gradually into the deeper portions of the grooves and gradually from said deeper portions to said plane surface.

2. In a tracing chart for teaching completion of a partially represented subject which comprises a sheet of paper-like material having an interrupted groove formed therein and provided with proximal ends, the chart being provided with a plane unbroken surface between said ends, the proximal ends of the grooves gradually decreasing in depth from a point spaced from the end of the respective groove to its extremity to merge smoothly into said plane surface.

CHARLES LORBER.